United States Patent
Nagai

(10) Patent No.: US 11,647,309 B2
(45) Date of Patent: May 9, 2023

(54) OPERATION METHOD OF IMAGE SENSOR

(71) Applicant: SK hynix Inc., Gyeonggi-do (KR)

(72) Inventor: Toshiaki Nagai, Tokyo (JP)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/550,578

(22) Filed: Dec. 14, 2021

(65) Prior Publication Data
US 2023/0081441 A1    Mar. 16, 2023

(30) Foreign Application Priority Data

Sep. 13, 2021   (KR) ........................ 10-2021-0121577

(51) Int. Cl.
   *H04N 5/3745*   (2011.01)
   *H04N 25/75*    (2023.01)
   *H04N 25/44*    (2023.01)
   *H04N 25/772*   (2023.01)

(52) U.S. Cl.
   CPC ............. H04N 25/75 (2023.01); H04N 25/44 (2023.01); H04N 25/772 (2023.01)

(58) Field of Classification Search
   None
   See application file for complete search history.

(56) References Cited

U.S. PATENT DOCUMENTS 10,483,303 B1 * 11/2019 Mabuchi ........... H01L 27/14607
10,506,182 B2   12/2019 Izuha et al.

FOREIGN PATENT DOCUMENTS

KR   10-1950431 B1   2/2019

OTHER PUBLICATIONS

Wenda Zhao et al., An Always-On 4x Compressive VGA CMOS Imager with 51 pJ/pixel and >32dB PSNR, 2020 IEEE Symposium on VLSI Circuits, Jun. 16-19, 2020, IEEE, Honolulu, HI, USA.

* cited by examiner

*Primary Examiner* — Mark T Monk
(74) *Attorney, Agent, or Firm* — IP & T Group LLP

(57) ABSTRACT

A method for operating an image sensor with a 4 rows×4 columns pixel group including 4 sub-pixel groups each including 4 pixels of 2 rows×2 columns includes: selecting and reading out a first pixel among 4 pixels in a first row of the pixel group; selecting and reading out, in a second row of the pixel group, a second pixel from a sub-pixel group other than a sub-pixel group including the first pixel; selecting and reading out, in a third row of the pixel group, a third pixel from a column other than a column including the first pixel and a column including the second pixel; and selecting and reading out, in a fourth row of the pixel group, a fourth pixel from a column other than the columns including the first pixel, the second pixel and the third pixel.

19 Claims, 8 Drawing Sheets

FIG. 9

OPERATION METHOD OF IMAGE SENSOR

CROSS-REFERENCE TO RELATED APPLICATIONS

The present application claims priority to Korean Patent Application No. 10-2021-0121577, filed on Sep. 13, 2021, which is incorporated herein by reference in its entirety.

BACKGROUND

1. Field

Various embodiments of the present invention relate to an image sensor.

2. Description of the Related Art

In a Complementary Metal Oxide Semiconductor (CMOS) image sensor (CIS), speed and power are in a trade-off relationship. Therefore, current CMOS image sensors mainly adopt a column-parallel structure that has the optimal trade-off relationship between speed and power. Since the column-parallel structure makes it difficult to integrate an analog-to-digital converter (ADC) in a narrow pixel width, a simple single-slope analog-to-digital converter (ADC) is being mainly used.

SUMMARY

Embodiments of the present invention are directed to an image sensor that randomly selects and senses a portion of pixels.

In accordance with an embodiment of the present invention, a method for operating an image sensor provided with a 4 rows×4 columns pixel group including 4 sub-pixel groups each including 4 pixels of 2 rows×2 columns includes: selecting and reading out a first pixel among 4 pixels in a first row of the pixel group; selecting and reading out, in a second row of the pixel group, a second pixel from a sub-pixel group other than a sub-pixel group including the first pixel; selecting and reading out, in a third row of the pixel group, a third pixel from a column other than a column including the first pixel and a column including the second pixel; and selecting and reading out, in a fourth row of the pixel group, a fourth pixel from a column other than the column including the first pixel, the column including the second pixel and the column including the third pixel.

In accordance with another embodiment of the present invention, a method for operating an image sensor provided with an 8 rows×8 columns pixel group including 8 sub-pixel groups each including 8 pixels of 4 rows×2 columns includes: selecting and reading out a first pixel among 8 pixels in a first row of the pixel group; selecting and reading out, in a second row of the pixel group, a second pixel from a sub-pixel group other than a sub-pixel group including the first pixel; selecting and reading out, in a third row of the pixel group, a third pixel from a sub-pixel group other than the sub-pixel group including the first pixel and the sub-pixel group including the second pixel; and selecting and reading out, in a fourth row of the pixel group, a fourth pixel from a sub-pixel group other than the sub-pixel group including the first pixel, the sub-pixel group including the second pixel and the sub-pixel group including the third pixel.

In accordance with yet another embodiment of the present invention, a method for operating an image sensor provided with an 8 rows×8 columns pixel group including 8 sub-pixel groups each including 8 pixels of 2 rows×4 columns includes: selecting and reading out a first pixel among 8 pixels in a first row of the pixel group; selecting and reading out, in a second row of the pixel group, a second pixel from a sub-pixel group other than a sub-pixel group including the first pixel; selecting and reading out, in a third row of the pixel group, a third pixel from a column other than a column including the first pixel and a column including the second pixel; and selecting and reading out, in a fourth row of the pixel group, a fourth pixel from a column other than columns of a sub-pixel group including the third pixel, the column including the first pixel and the column including the second pixel.

In accordance with still another embodiment of the present invention, a method for operating an image sensor provided with an N rows×N columns pixel group including N sub-pixel groups each including N neighboring pixels, where N is an integer equal to or greater than 4 includes: selecting and reading out a first pixel among N pixels in a first row of the pixel group; selecting and reading out, in a second row of the pixel group, a second pixel from a sub-pixel group other than a sub-pixel group including the first pixel; selecting and reading out, among N pixels in a third row of the pixel group, a third pixel other than pixels included in the sub-pixel group including the first pixel, pixels included in the sub-pixel group including the second pixel, a pixel of a column including the first pixel and a pixel of a column including the second pixel; and selecting and reading out, among N pixels in a fourth row of the pixel group, a fourth pixel other than pixels included in the sub-pixel group including the first pixel, pixels included in the sub-pixel group including the second pixel, pixels included in the sub-pixel group including the third pixel, a pixel of the column including the first pixel, a pixel of the column including the second pixel and a pixel of a column including the third pixel.

In accordance with still another embodiment of the present invention, an image sensor includes: a pixel array including N rows×N columns pixel groups each including N sub-pixel groups each of which includes N neighboring pixels, where N is an integer equal to or greater than 4; a row decoder suitable for selecting pixels of the pixel array for each row line and controlling an operation; a read-out circuit suitable for analog-to-digital converting pixel signals that are output from pixels in a row which is selected by the row decoder in the pixel array; and a compression controller suitable for controlling the read-out circuit to read out a portion of columns instead of reading out all columns of the pixel array during a compression sensing operation.

In accordance with still another embodiment of the present invention, a method for operating an image sensor includes: dividing a pixel array into groups each having N×N pixels, each group divided into N number of sub-groups each having N number of the pixels, where N is 4 or greater; and performing, on a row-by-row basis, a compression sensing operation on the pixel array by reading out at most a single pixel in each row and at most a single pixel in each column, in each of the groups, and at most a single pixel in each of the sub-groups.

BRIEF DESCRIPTION OF THE DRAWINGS

FIG. 9 illustrates pixels selected from a pixel group in consideration of a rule related to a color filter in accordance with an embodiment of the present invention.

DETAILED DESCRIPTION

Figure 1:
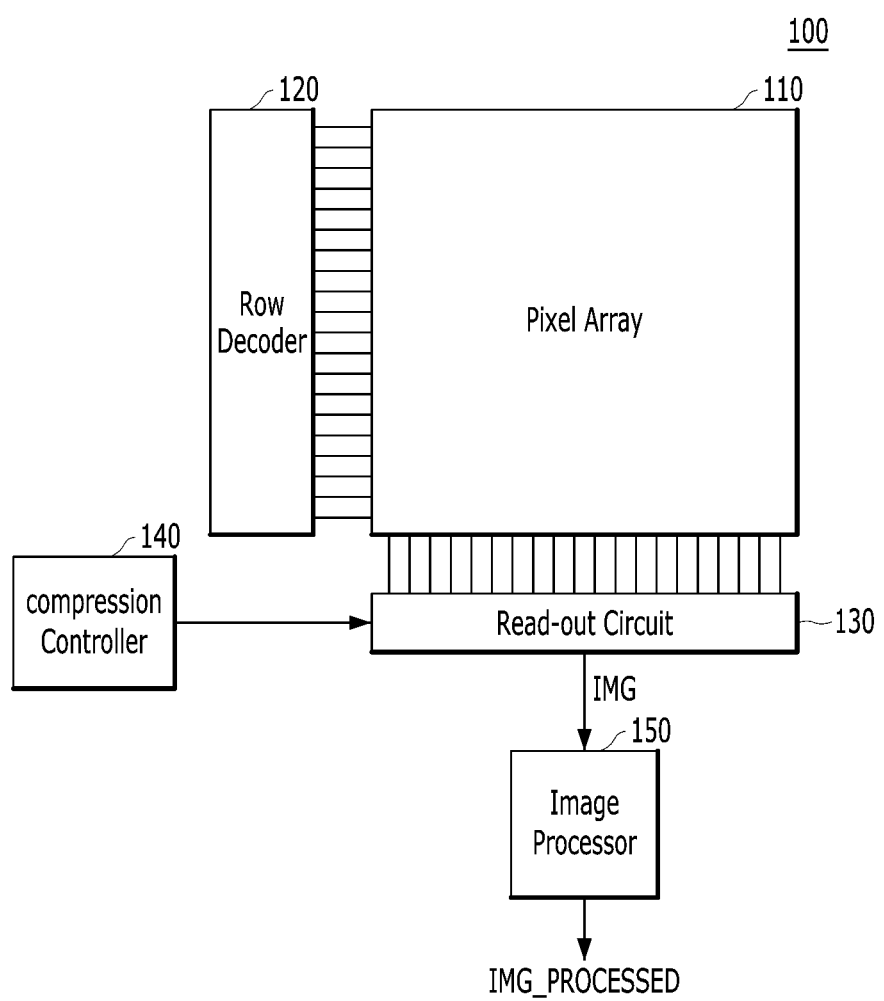
FIG. 1 is a block diagram illustrating an image sensor in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating an image sensor 100 in accordance with an embodiment of the present invention.

Referring to FIG. 1, the image sensor 100 may include a pixel array 110, a row decoder 120, a read-out circuit 130, a compression controller 140, and an image processor 150.

The pixel array 110 may include a plurality of pixels that are formed in an array including a plurality of rows and a plurality of columns. The pixels may output pixel signals based on the sensed light.

The row decoder 120 may select the pixels of the pixel array 110 for each row line and control the operation. Pixels of one row at one time may output pixel signals to a read-out circuit 130 under the control of the row decoder 120.

The read-out circuit 130 may perform an analog-to-digital conversion to convert the pixel signals that are analog signals output from the pixel array 110 into digital signals. The result of converting the pixel signals into the digital signals may be output as an image. The read-out circuit 130 may perform an analog-to-digital conversion on the pixel signals of the pixels of all the columns of a selected row at once.

During a normal sensing operation of the image sensor 100, the pixels of the pixel array 110 may be read out on the basis of a row unit. Pixel signals may be output from all pixels in the first row of the pixel array 110, and the pixel signals of all the pixels in the first row may be analog-to-digital converted by the read-out circuit 130. Subsequently, pixel signals may be output from all pixels in the second row of the pixel array 120, and the pixel signals of all the pixels in the second row may be analog-to-digital converted by the read-out circuit 130. Similarly, in the other rows, too, pixel signals of all pixels may be transferred to the read-out circuit 130 on the basis of a row unit, and all the pixel signals in the corresponding rows may be analog-to-digital converted by the read-out circuit 130.

The compression controller 140 may control a compression sensing operation of the image sensor 100. Here, the compression sensing operation may refer to an operation of reading out some pixels (e.g., 1/4 or 1/8 of all pixels) instead of reading out all the pixels of the pixel array 110. The compression sensing operation may be performed by the compression controller 140 controlling the read-out circuit 130. The compression sensing operation will be described in detail below.

The image processor 150 may process an image IMG which is output from the read-out circuit 130 to generate a processed image IMG_PROCESSED. The image processor 150 may perform various operations to increase image quality. In particular, the image processor 150 may generate a high-resolution image IMG_PROCESSED by processing a low-resolution image IMG which is generated during a compression sensing operation. Although it is illustrated herein that the image processor 150 is included in the image sensor 100, the image processor 150 may exist outside the image sensor 100.

Figure 2:
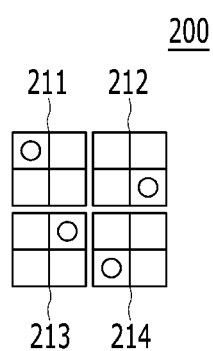
FIGS. 2 and 3 illustrate rules for selecting a pixel which is read out among the pixels of the pixel array when the image sensor 100 performs a compression sensing operation in accordance with an embodiment of the present invention.
Figure 3:
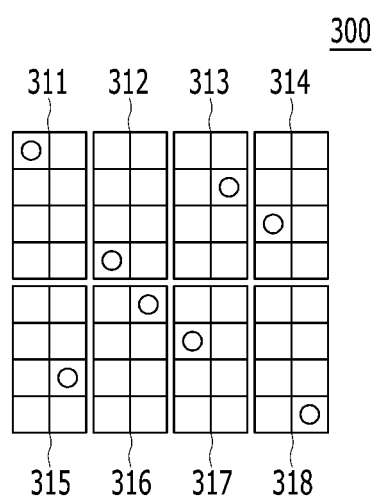

FIGS. 2 and 3 illustrate rules for selecting a pixel which is read out among the pixels of the pixel array 110 when the image sensor 100 performs a compression sensing operation in accordance with an embodiment of the present invention.

Rules for selecting a pixel which is read out from the pixel array 110 during a compression sensing operation are as shown in the following (1) to (3).

(1) When a compression sensing operation is performed with a compression rate of 1/N, the pixel array may be divided into pixel groups of N (rows)×N (columns). That is, each pixel group may be an array of N×N pixels. One pixel group may be divided into N sub-pixel groups, each containing N pixels.

FIG. 2 illustrates one pixel group 200 when the compression rate is 1/4. Referring to FIG. 2, the pixel group 200 may include 16 pixels that are arranged in 4 (rows)×4 (columns). Also, it may be seen that one pixel group 200 is divided into 4 sub-pixel groups 211 to 214 each of which includes 4 pixels. The pixel array 110 may include a plurality of pixel groups 200 as shown in FIG. 2. For example, when the pixel array 110 is formed of 1024 (rows)×1024 (columns), the pixel array 110 may include 655536 pixel groups 200 (655536=1024*1024/16) as shown in FIG. 2.

FIG. 3 illustrates one pixel group 300 when the compression rate is 1/8 in accordance with an embodiment of the present invention. Referring to FIG. 3, one pixel group may include 64 pixels that are arranged in 8 (rows)×8 (columns). Also, it may be seen that one pixel group 300 is divided into 8 sub-pixel groups 311 to 318 each of which includes 8 pixels. The pixel array 110 may include a plurality of pixel groups 300 as shown in FIG. 3. For example, when the pixel array 110 is formed of 1024 (rows)×1024 (columns), the pixel array 110 may include 16384 pixel groups 300 (16384=1024*1024/64) as shown in FIG. 3.

(2) In one pixel group, more than 2 pixels are not selected in one row, and more than 2 pixels are not selected in one column.

Pixels selected in the pixel group 200 of FIG. 2 are marked with a circle, and it may be seen that in the pixel group 200, only one pixel is selected in one row and only one pixel is selected in one column.

In the pixel group 300 of FIG. 3, too, the selected pixels are also marked with a circle, and it may be seen that in the pixel group 300, only one pixel is selected in one row and only one pixel is selected in one column.

It may be seen that in both FIGS. 2 and 3, 2 or more pixels are not selected in one row and 2 or more pixels are not selected in one column.

(3) More than 2 pixels are not selected in one sub-pixel group.

Referring to FIGS. 2 and 3, it may be seen that only one pixel is selected in each of the sub-pixel groups 211 to 214 and 311 to 318.

Hereafter, a process of selecting pixels based on the rules of (1) to (3) may be described.

Figure 4:
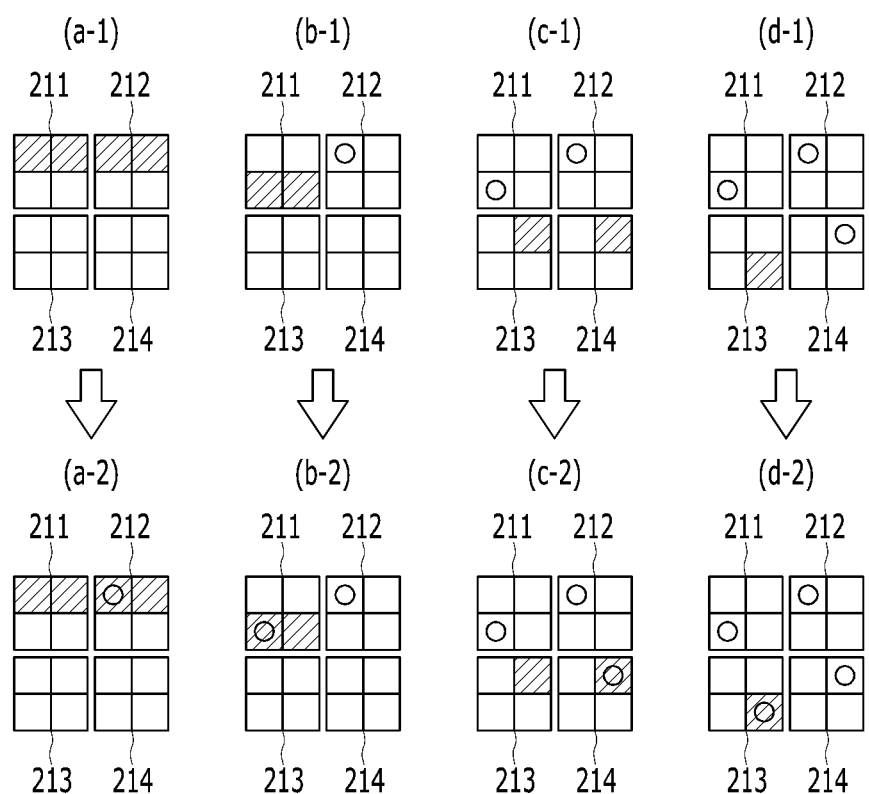
FIG. 4 illustrates an operation of selecting pixels during a compression sensing operation of the image sensor in accordance with a first embodiment of the present invention.

FIG. 4 illustrates an operation of selecting pixels during a compression sensing operation of the image sensor 100 in accordance with a first embodiment of the present invention. Here, an operation performed when the image sensor 100 performs a compression sensing operation at a compression rate of 1/4 will be described.

Selectable pixels in the first row of the pixel group 200 are marked with slashes in (a-1) of FIG. 4. In the first row, one pixel among 4 pixels may be selected. The compression controller 140 may control the read-out circuit 130 to randomly select one pixel among the 4 pixels of the first row during a readout operation of the first row of the pixel group 200 and read out the selected pixel.

A pixel selected from the first row of the pixel group 200 is marked with a circle in (a-2) of FIG. 4. It may be seen as a result of random selection among the 4 pixels marked with slashes in (a-1) that a pixel in the third column is selected.

Selectable pixels in the second row of the pixel group 200 are marked with slashes in (b-1) of FIG. 4. In the second row, one pixel among the pixels of the other sub-pixel group 211 may be selected instead of the sub-pixel group 212 to which the pixel selected in the first row belongs. The compression controller 140 may control the read-out circuit 130 to randomly select one pixel among the 2 selectable pixels and read out the selected pixel.

A pixel selected from the second row of the pixel group 200 is marked with a circle in (b-2) of FIG. 4. It may be seen as a result of random selection among the 2 pixels marked with slashes in (b-1) that a pixel in the first column is selected.

Selectable pixels in the third row of the pixel group 200 are marked with slashes in (c-1) of FIG. 4. In the third row, among the 4 columns, 2 columns may be selected except for the same column as that of the pixel which is selected in the first row and the same column as that of the pixel which is selected in the second row. The compression controller 140 may control the read-out circuit 130 to randomly select one pixel among the 2 selectable pixels and read out the selected pixel.

A pixel selected from the third row of the pixel group 200 is marked with a circle in (c-2) of FIG. 4. It may be seen as a result of random selection among the 2 pixels marked with slashes shown in (c-1) that the pixel in the third column is selected.

A selectable pixel in the fourth row of the pixel group is marked with slashes in (d-1) of FIG. 4. Since a column which is different from the pixels selected in the previous rows is selectable, it may be seen that only the second column is selectable. The compression controller 140 may control the read-out circuit 130 to select a pixel of the selectable second column and read out the selected pixel.

A pixel selected in the fourth row of the pixel group is marked with a circle in (d-2) of FIG. 4.

When a pixel is selected and read out through the process of FIG. 4, only one column may be read out in one row in the pixel group 200. Accordingly, the amount of current consumed by the read-out circuit 130 for analog-to-digital conversion for each row may be uniformly reduced to 1/4. Also, since one pixel is selected from each of the sub-pixel groups 211 to 214, the image processor 150 may use the selected pixel as a representative pixel of the corresponding sub-pixel group to facilitate image processing.

Figure 5:
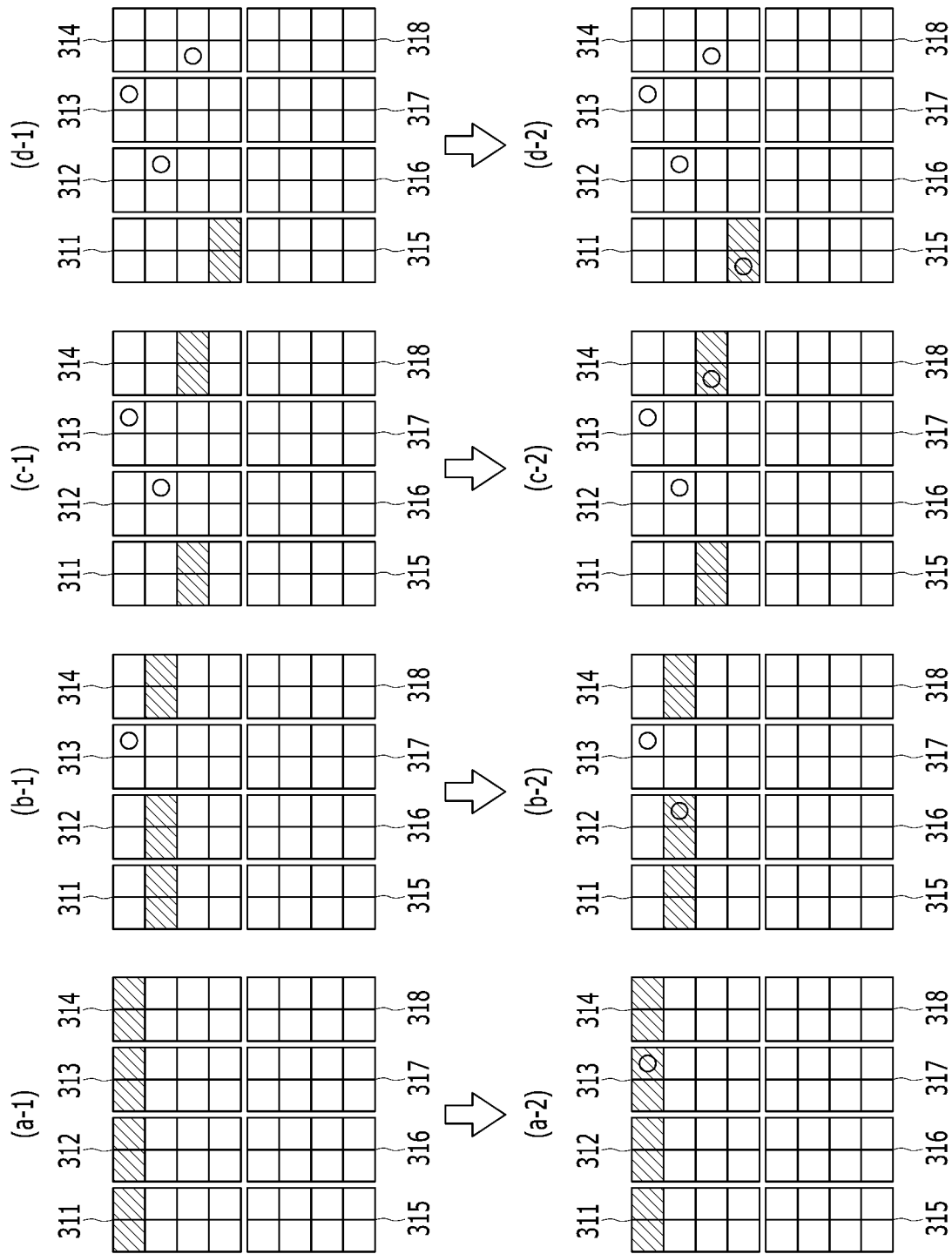
FIGS. 5 and 6 illustrate an operation of selecting pixels during a compression sensing operation of the image sensor in accordance with a second embodiment of the present invention.
Figure 6:
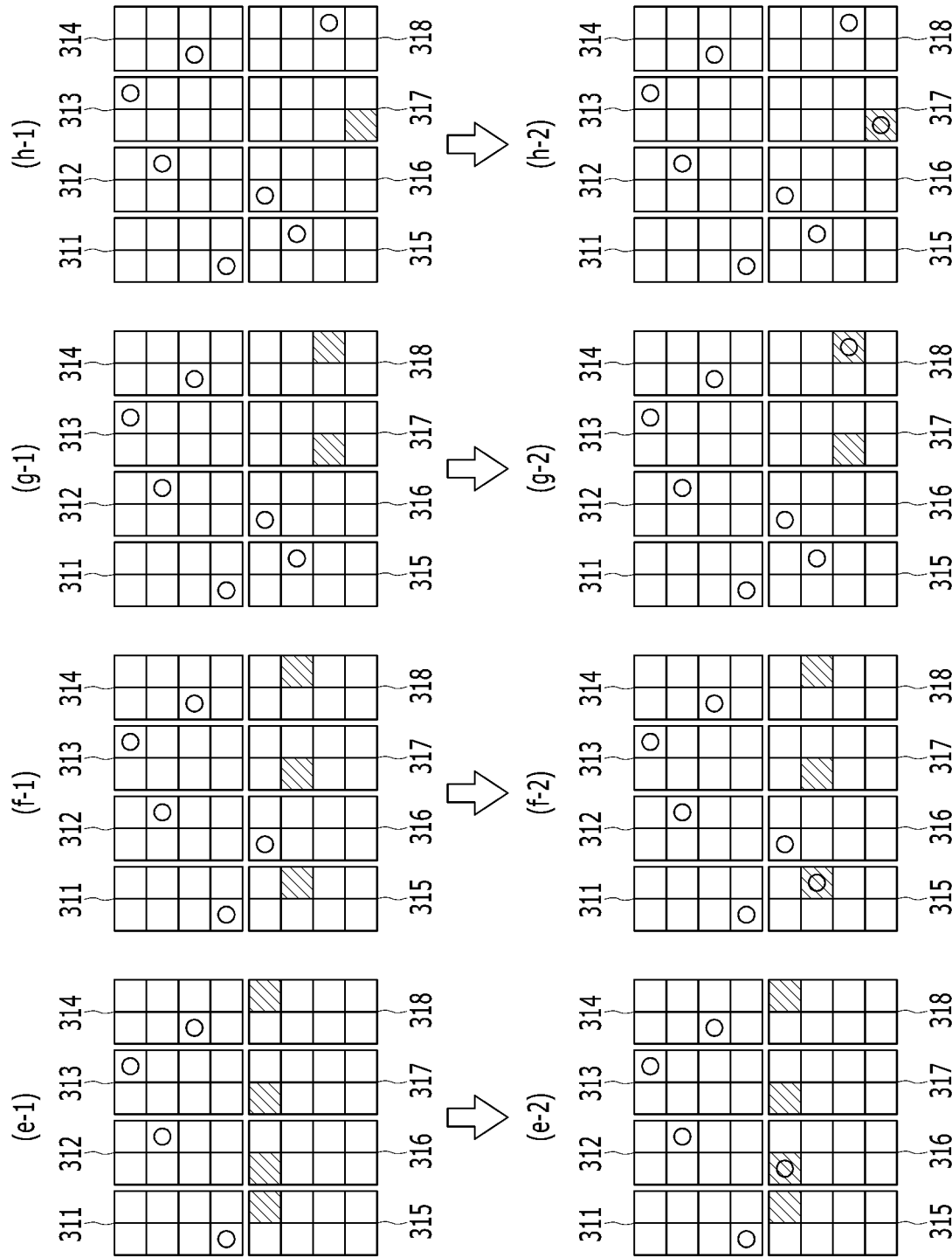

FIGS. 5 and 6 illustrate an operation of selecting pixels during a compression sensing operation of the image sensor 100 in accordance with a second embodiment of the present invention. Here, an operation in which the image sensor 100 performs a compression sensing operation at a compression rate of 1/8 and the sub-pixel groups are formed of 4 (rows)×2 (columns) will be described.

Selectable pixels in the first row of a pixel group 300 are marked with slashes in (a-1) of FIG. 5. In the first row, one pixel among 8 pixels may be selected. The compression controller 140 may control the read-out circuit 130 to randomly select one pixel among the 8 pixels of the first row during a read-out operation of the first row of the pixel group 300 and read out the selected pixel.

A pixel selected from the first row of the pixel group 300 is marked with a circle in (a-2) of FIG. 5. It may be seen as a result of random selection among the 8 pixels marked with slashes shown in (a-1) that a pixel in the sixth column is selected.

Selectable pixels in the second row of the pixel group 300 are marked with slashes in (b-1) of FIG. 5. In the second row, one pixel among the pixels of the sub-pixel groups 311, 312 and 314 may be selected instead of the sub-pixel group 313 to which the pixel selected in the first row belongs. The compression controller 140 may control the read-out circuit 130 to randomly select one pixel among the 6 pixels shown in (b-1) and read out the selected pixel.

A pixel selected in the second row of the pixel group 300 is marked with a circle in (b-2) of FIG. 5. It may be seen as a result of random selection among the 6 pixels marked with slashes shown in (b-1) that the pixel in the fourth column is selected.

Selectable pixels in the third row of the pixel group 300 are marked with slashes in (c-1) of FIG. 5. In the third row, one pixel among the pixels of the sub-pixel groups 311 and 314 may be selected instead of the sub-pixel group 313 to which the pixel selected in the first row belongs and the sub-pixel group 312 to which the pixel selected in the second row belongs. The compression controller 140 may control the read-out circuit 130 to randomly select one pixel among the 4 pixels shown in (c-1) and read out the selected pixel.

A pixel selected from the third row of the pixel group 300 is marked with a circle in (c-2) of FIG. 5. It may be seen as a result of random selection among the 4 pixels marked with slashes shown in (c-1) that the pixel in the seventh column is selected.

Selectable pixels in the fourth row of the pixel group 300 are marked with slashes in (d-1) of FIG. 5. In the fourth row, one pixel among the pixels of the sub-pixel group 311 may be selected, instead of the sub-pixel group 313 to which the pixel selected in the first row belongs, the sub-pixel group 312 to which the pixel selected in the second row belongs, and the sub-pixel group 314 to which the pixel selected in the third row belongs. The compression controller 140 may control the read-out circuit 130 to randomly select one pixel among the 2 pixels marked with slashes in (d-1) and read out the selected pixel.

A pixel selected in the fourth row of the pixel group 300 is marked with a circle in (d-2) of FIG. 5. It may be seen as a result of random selection among the 2 pixels marked with slashes shown in (d-1) that the pixel in the first column is selected.

Selectable pixels in the fifth row of the pixel group 300 are marked with slashes in (e-1) of FIG. 6. In the fifth row, one column among the columns except the columns to which the pixels selected in the first to fourth rows belong may be selected. The compression controller 140 may control the read-out circuit 130 to randomly select one pixel among the 4 columns shown in (e-1) and read out the selected pixel.

A pixel selected in the fifth row of the pixel group 300 is marked with a circle in (e-2) of FIG. 6. It may be seen as a result of random selection among the 4 pixels marked with slashes in (e-1) that the pixel in the second column is selected.

Selectable pixels in the sixth row of the pixel group 300 are marked with slashes in (f-1) of FIG. 6. In the sixth row, one among the columns excluding the columns of the sub-pixel group 316 to which the pixel selected in the fifth row belongs and the columns to which the pixels selected in the first to fourth rows belong may be selected. The compression controller 140 may control the read-out circuit 130 to randomly select one pixel among the 3 columns marked with slashes in (f-1) and read out the selected pixel.

A pixel selected in the sixth row of the pixel group 300 is marked with a circle in (f-2) of FIG. 6. It may be seen as a result of random selection among the 3 pixels marked with slashes in (f-2) that the pixel in the second column is selected.

Selectable pixels in the seventh row of the pixel group 300 are marked with slashes in (g-1) of FIG. 6. In the seventh row, one among the columns excluding the columns of the sub-pixel groups 311 and 312 to which the pixel selected in the fifth row and the pixel selected in the sixth row belong and the columns to which the pixels selected in the first to fourth rows belong may be selected. The compression controller 140 may control the read-out circuit 130 to randomly select one pixel among the 2 columns marked with slashes in (g-1) and read out the selected pixel.

A pixel selected in the seventh row of the pixel group 300 is marked with a circle in (g-2) of FIG. 6. It may be seen as a result of random selection among the 2 pixels marked with slashes in (g-2) that the pixel in the eighth column is selected.

A selectable pixel in the eighth row of the pixel group 300 is marked with slashes in (h-1) of FIG. 6. In the eighth row, since a column different from that of the pixels selected in the previous rows may be selected, it may be seen that only the fifth column is selectable. The compression controller 140 may control the read-out circuit 130 to select a pixel of the selectable fifth column and read out the selected pixel.

A pixel selected in the eighth row of the pixel group 300 is marked with a circle in (h-2) of FIG. 6.

When a pixel is selected and read out through the processes of FIGS. 5 and 6, only one column may be read out from one row in the pixel group 300. Accordingly, the amount of current consumed by the read-out circuit 130 for an analog-to-digital conversion for each row may be uniformly reduced to 1/8. Also, since one pixel is selected from each of the sub-pixel groups 311 to 318, the image processor 150 may easily process an image by using the selected pixel as a representative pixel of the corresponding sub-pixel group.

Figure 7:
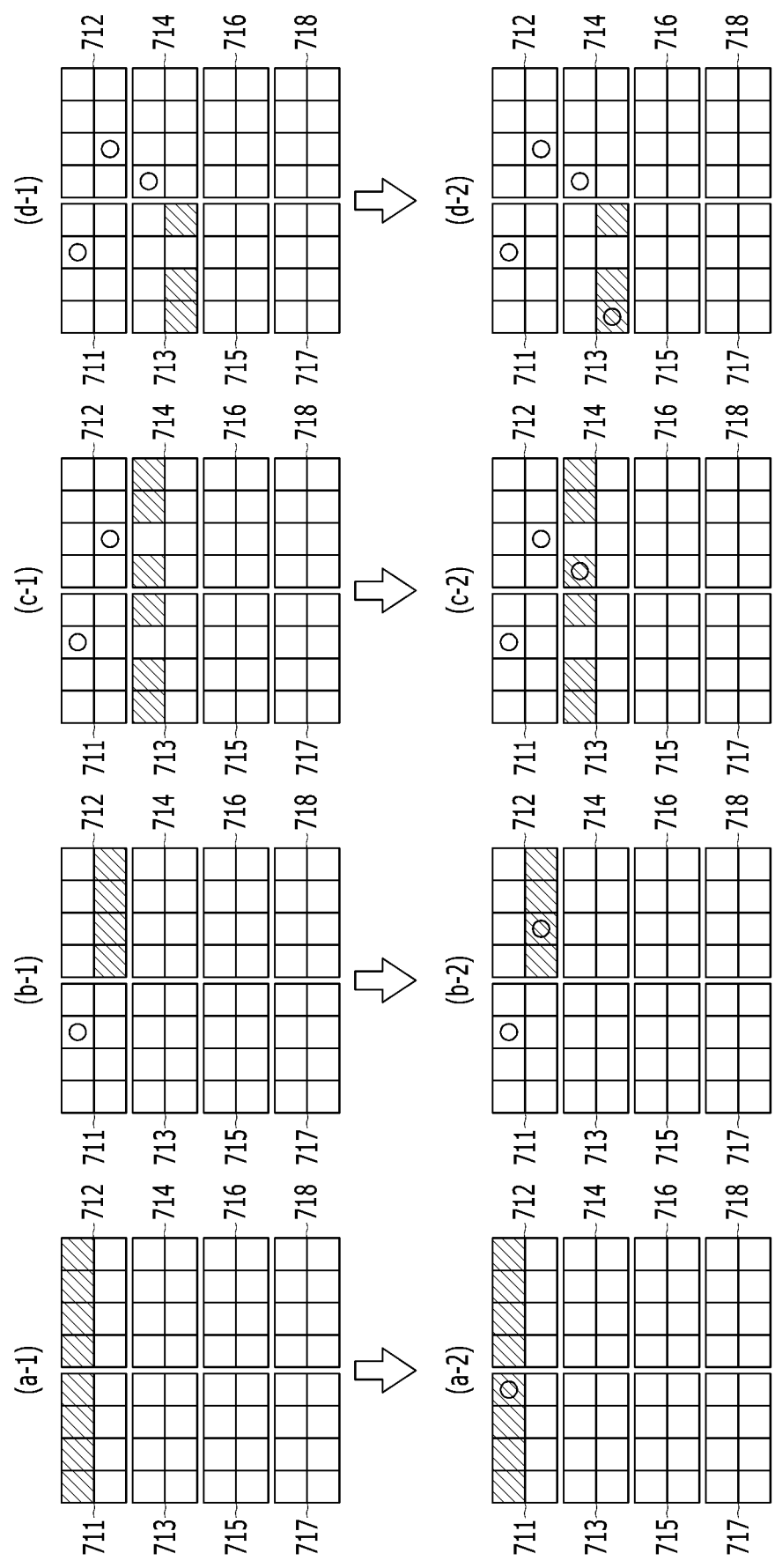
FIGS. 7 and 8 illustrate an operation of selecting pixels during a compression sensing operation of the image sensor in accordance with a third embodiment of the present invention.
Figure 8:
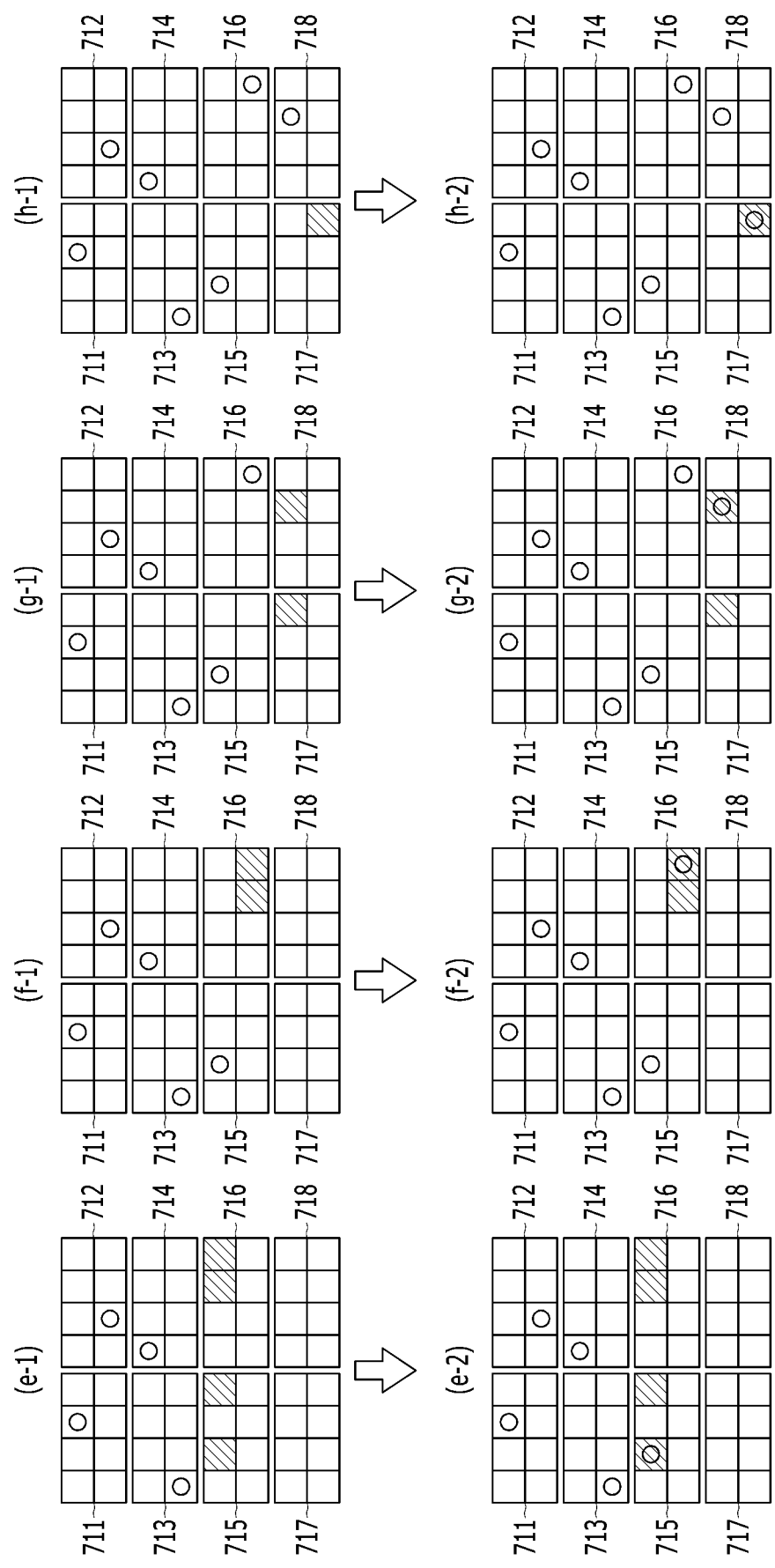

FIGS. 7 and 8 illustrate an operation of selecting pixels during a compression sensing operation of the image sensor 100 in accordance with a third embodiment of the present invention. Here, an operation in which the image sensor 100 performs a compression sensing operation at a compression rate of 1/8 so that a pixel group is formed of 8 (rows)×8 (columns) and each pixel group includes 8 sub-pixel groups each of which is formed of 2 (rows)×4 (columns) will be described.

Selectable pixels in the first row of a pixel group are marked with slashes in (a-1) of FIG. 7. In the first row, one pixel among 8 pixels may be selected. The compression controller 140 may control the read-out circuit 130 to randomly select one pixel among 8 pixels of the first row during a read-out operation of the first row of the pixel group and read out the selected pixel.

A pixel selected from the first row of a pixel group is marked with a circle in (a-2) of FIG. 7. It may be seen as a result of random selection among the 8 pixels marked with slashes in (a-1) that the pixel in the third column is selected.

Selectable pixels in the second row of the pixel group are marked with slashes in (b-1) of FIG. 7. In the second row, one pixel among the pixels of the sub-pixel groups 712 excluding the sub-pixel group 711 to which the pixel selected in the first row belongs may be selected. The compression controller 140 may control the read-out circuit 130 to randomly select one pixel among the 4 pixels marked with slashes in (b-1) and read out the selected pixel.

A pixel selected in the second row of the pixel group is marked with a circle in (b-2) of FIG. 7. It may be seen as a result of random selection among the 4 pixels marked with slashes in (b-1) that the pixel in the sixth column is selected.

Selectable pixels in the third row of the pixel group are marked with slashes in (c-1) of FIG. 7. In the third row, one among the columns excluding the columns to which the pixels selected in the first and second rows belong may be selected. The compression controller 140 may control the read-out circuit 130 to randomly select one pixel among the 6 pixels marked with slashes in (c-1) and read out the selected pixel.

A pixel selected in the third row of the pixel group is marked with a circle in (c-2) of FIG. 7. It may be seen as a result of random selection among the 6 pixels marked with slashes in (c-1) that the pixel in the fifth column is selected.

Selectable pixels in the fourth row of the pixel group are marked with slashes in (d-1) of FIG. 7. In the fourth row, one among the columns excluding the columns of the sub-pixel group 714 to which the pixel selected in the third row belongs and the columns to which the pixels selected in the first and second rows belong may be selected. The compression controller 140 may control the read-out circuit 130 to randomly select one pixel among the 3 pixels marked with slashes in (d-1) and read out the selected pixel.

A pixel selected in the fourth row of the pixel group is marked with a circle in (d-2) of FIG. 7. It may be seen as a result of random selection among the 3 pixels marked with slashes in (d-1) that the pixel in the first column is selected.

Selectable pixels in the fifth row of the pixel group are marked with slashes in (e-1) of FIG. 8. In the fifth row, one among the columns excluding the columns to which the pixels selected in the first to fourth rows belong may be selected. The compression controller 140 may control the read-out circuit 130 to randomly select one pixel among the 4 pixels marked with slashes in (e-1) and read out the selected pixel.

A pixel selected in the fifth row of the pixel group is marked with a circle in (e-2) of FIG. 8. It may be seen as a result of random selection among the 4 pixels marked with slashes in (e-1) that the pixel in the second column is selected.

Selectable pixels in the sixth row of the pixel group are marked with slashes in (f-1) of FIG. 8. In the sixth row, one among the columns excluding the columns of the sub-pixel groups 715 to which the pixel selected in the fifth row belongs and the columns to which the pixels selected in the first to fourth rows belong may be selected. The compression controller 140 may control the read-out circuit 130 to randomly select one pixel among the 2 pixels marked with slashes in (f-1) and read out the selected pixel.

A pixel selected in the sixth row of the pixel group is marked with a circle in (f-2) of FIG. 8. It may be seen as a result of random selection among the 2 pixels marked with slashes in (f-1) that the pixel in the eighth column is selected.

Selectable pixels in the seventh row of the pixel group are marked with slashes in (g-1) of FIG. 8. In the seventh row, one among the columns excluding the columns to which the pixels selected in the first to sixth rows belong may be selected. The compression controller 140 may control the read-out circuit 130 to randomly select one pixel among the 2 pixels marked with slashes in (g-1) and read out the selected pixel.

A pixel selected in the seventh row of the pixel group is marked with a circle in (g-2) of FIG. 8. It may be seen as a result of random selection among the 2 pixels marked with slashes in (g-1) that the pixel of the seventh column is selected.

A selectable pixel in the eighth row of the pixel group is marked with slashes in (h-1) of FIG. 8. In the eighth row, one among the columns excluding the columns to which the pixels selected in the first to seventh rows belong may be selected. The compression controller 140 may control the read-out circuit 130 to select one pixel among the selectable fourth column and read out the selected pixel.

A pixel selected in the eighth row of the pixel group is marked with a circle in (h-2) of FIG. 8.

In FIG. 4, the process of selecting pixels to be read out when the value of N is 4 at the compression rate 1/N of a compression sensing operation is described, and in FIGS. 5 to 8, the process of selecting pixels to be read out when the value of N is 8 is described. Even when the value of N is different from this, the same rule as described above may be applied. That is, when a pixel to be read out is selected from the $K^{th}$ row within the pixel group, where K is an integer equal to or greater than 2 and equal to or less than N, one pixel among the pixels that are not included in the sub-pixel groups to which the pixels selected in the first to $(K-1)^{th}$ rows belong and also not included in the columns to which the pixels selected in the first to $(K-1)^{th}$ rows belong may be selected.

In order to consider a color filter when a pixel is selected in the process of performing a compression sensing operation, one more rule may be added to the rules of (1) to (3) described above.

(4) Pixels of the same color may not be selected in consecutive rows.

Figure 9:
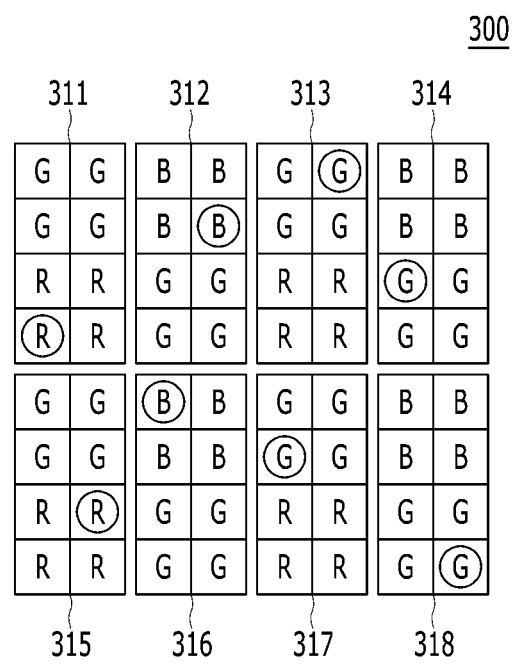

That is, pixels of different colors may have to be selected in the consecutive rows. An example of selecting pixels from the pixel group 300 by further considering the rule (4) is shown in FIG. 9. Referring to FIG. 9, which illustrates pixels selected from a pixel group 300 in consideration of a rule related to a color filter in accordance with an embodiment of the present disclosure, it may be seen that the rules of (1) to (3) are followed and the rule of (4) that pixels of different colors are selected in the consecutive rows is kept.

According to an embodiment of the present disclosure, a portion of pixels may be randomly selected and sensed in an image sensor.

The effects desired to be obtained in the embodiments of the present disclosure are not limited to the effects described above, and other effects not described above may also be clearly understood by those of ordinary skill in the art to which the present invention pertains.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A method for operating an image sensor provided with a 4 rows×4 columns pixel group including 4 sub-pixel groups each including 4 pixels of 2 rows×2 columns, the method comprising:
   selecting and reading out a first pixel among 4 pixels in a first row of the pixel group;
   selecting and reading out, in a second row of the pixel group, a second pixel from a sub-pixel group other than a sub-pixel group including the first pixel;
   selecting and reading out, in a third row of the pixel group, a third pixel from a column other than a column including the first pixel and a column including the second pixel; and
   selecting and reading out, in a fourth row of the pixel group, a fourth pixel from a column other than the column including the first pixel, the column including the second pixel and the column including the third pixel.

2. The method of claim 1,
   wherein the first pixel is included in a first sub-pixel group of the 4 sub-pixel groups,
   wherein the second pixel is included in a second sub-pixel group of the 4 sub-pixel groups,
   wherein the third pixel is included in a third sub-pixel group among the 4 sub-pixel groups, and
   wherein the fourth pixel is included in a fourth sub-pixel group among the 4 sub-pixel groups.

3. The method of claim 2, wherein, among the first to fourth pixels, pixels in neighboring rows are pixels of different colors.

4. A method for operating an image sensor provided with an 8 rows×8 columns pixel group including 8 sub-pixel groups each including 8 pixels of 4 rows×2 columns, the method comprising:
   selecting and reading out a first pixel among 8 pixels in a first row of the pixel group;
   selecting and reading out, in a second row of the pixel group, a second pixel from a sub-pixel group other than a sub-pixel group including the first pixel;
   selecting and reading out, in a third row of the pixel group, a third pixel from a sub-pixel group other than the sub-pixel group including the first pixel and the sub-pixel group including the second pixel; and
   selecting and reading out, in a fourth row of the pixel group, a fourth pixel from a sub-pixel group other than the sub-pixel group including the first pixel, the sub-pixel group including the second pixel and the sub-pixel group including the third pixel.

5. The method of claim 4, further comprising:
   selecting and reading out, in a fifth row of the pixel group, a fifth pixel from a column other than a column including the first pixel, a column including the second pixel, a column including the third pixel and a column including the fourth pixel;
   selecting and reading out, in a sixth row of the pixel group, a sixth pixel from a column other than columns of the sub-pixel group including the fifth pixel, the column including the first pixel, the column including the second pixel, the column including the third pixel and the column including the fourth pixel;

selecting and reading out, in a seventh row of the pixel group, a seventh pixel from a column other than the columns of the sub-pixel group including the fifth pixel, columns of the sub-pixel group including the sixth pixel, the column including the first pixel, the column including the second pixel, the column including the third pixel, and the column including the fourth pixel; and selecting and reading out, in an eighth row of the pixel group, an eighth pixel from a column other than the columns including the first to seventh pixels.

6. The method of claim 5, wherein the first to eighth pixels are included in different sub-pixel groups in the pixel group.

7. The method of claim 6, wherein, among the first to eighth pixels, pixels in neighboring rows are pixels of different colors.

8. A method for operating an image sensor provided with an 8 rows×8 columns pixel group including 8 sub-pixel groups each including 8 pixels of 2 rows×4 columns, the method comprising:

selecting and reading out a first pixel among 8 pixels in a first row of the pixel group;

selecting and reading out, in a second row of the pixel group, a second pixel from a sub-pixel group other than a sub-pixel group including the first pixel;

selecting and reading out, in a third row of the pixel group, a third pixel from a column other than a column including the first pixel and a column including the second pixel; and selecting and reading out, in a fourth row of the pixel group, a fourth pixel from a column other than columns of a sub-pixel group including the third pixel, the column including the first pixel and the column including the second pixel.

9. The method of claim 8, further comprising:

selecting and reading out, in a fifth row of the pixel group, a fifth pixel from a column other than the column including the first pixel, the column including the second pixel, a column including the third pixel and a column including the fourth pixel;

selecting and reading out, in a sixth row of the pixel group, a sixth pixel from a column other than columns of the sub-pixel group including the fifth pixel, the column including the first pixel, the column including the second pixel, the column including the third pixel and the column including the fourth pixel;

selecting and reading out, in a seventh row of the pixel group, a seventh pixel from a column other than the column including the first pixel, the column including the second pixel, the column including the third pixel, the column including the fourth pixel, the column including the fifth pixel and the column including the sixth pixel; and selecting and reading out, in an eighth row of the pixel group, an eighth pixel from a column other than the columns including the first to seventh pixels.

10. The method of claim 9, wherein the first to eighth pixels are included in different sub-pixel groups in the pixel group.

11. The method of claim 10, wherein among the first to eighth pixels, pixels in neighboring rows are pixels of different colors.

12. A method for operating an image sensor provided with an N rows×N columns pixel group including N sub-pixel groups each including N neighboring pixels, where N is an integer equal to or greater than 4, the method comprising:

selecting and reading out a first pixel among N pixels in a first row of the pixel group;

selecting and reading out, in a second row of the pixel group, a second pixel from a sub-pixel group other than a sub-pixel group including the first pixel;

selecting and reading out, among N pixels in a third row of the pixel group, a third pixel other than pixels included in the sub-pixel group including the first pixel, pixels included in the sub-pixel group including the second pixel, a pixel of a column including the first pixel and a pixel of a column including the second pixel; and selecting and reading out, among N pixels in a fourth row of the pixel group, a fourth pixel other than pixels included in the sub-pixel group including the first pixel, pixels included in the sub-pixel group including the second pixel, pixels included in the sub-pixel group including the third pixel, a pixel of the column including the first pixel, a pixel of the column including the second pixel and a pixel of a column including the third pixel.

13. The method of claim 12, further comprising selecting and reading out, among N pixels in a $K^{th}$ row of the pixel group, a $K^{th}$ pixel other than pixels included in sub-pixel groups including the first to $(K-1)^{th}$ pixels and pixels of columns including the first to $(K-1)^{th}$ pixels, where K is an integer equal to or greater than 5 and equal to or less than N.

14. The method of claim 13, wherein the first to $K^{th}$ pixels are included in different sub-pixel groups and different columns in the pixel group.

15. The method of claim 14, wherein, among the first to $K^{th}$ pixels, pixels in neighboring rows are pixels of different colors.

16. An image sensor, comprising:

a pixel array including N rows×N columns pixel groups each including N sub-pixel groups each of which includes N neighboring pixels, where N is an integer equal to or greater than 4;

a row decoder suitable for selecting pixels of the pixel array for each row line and controlling an operation;

a read-out circuit suitable for analog-to-digital converting pixel signals that are output from pixels in a row which is selected by the row decoder in the pixel array; and a compression controller suitable for controlling the read-out circuit to read out a portion of columns instead of reading out all columns of the pixel array during a compression sensing operation.

17. The image sensor of claim 16, wherein the compression controller controls the read-out circuit to:

select and read out a first pixel among N pixels during a read-out operation of a first row of the pixel group;

select and read out, during a read-out operation of a second row of the pixel group, a second pixel from a sub-pixel group other than a sub-pixel group including the first pixel;

select and read out, during a read-out operation of a third row of the pixel group, a third pixel other than pixels included in the sub-pixel group including the first pixel, pixels included in the sub-pixel group including the second pixel, a pixel of a column including the first pixel and a pixel of a column including the second pixel; and select and read out, during a read-out operation of a fourth row of the pixel group, a fourth pixel other than pixels included in the sub-pixel group including the first pixel, pixels included in the sub-pixel group including the second pixel, pixels included in the sub-pixel group including the third pixel, a pixel of the column including the first pixel, a pixel of the column including the second pixel and a pixel of a column including the third pixel.

18. The image sensor of claim 17, wherein the compression controller controls the read-out circuit further to select and read out, during a read-out operation of a $K^{th}$ row of the pixel group, a $K^{th}$ pixel other than pixels included in sub-pixel groups including the first to $(K-1)^{th}$ pixels and pixels of columns including the first to $(K-1)^{th}$ pixels, where K is an integer equal to or greater than 5 and equal to or less than N.

19. The image sensor of claim 18, further comprising an image processor suitable for generating a high-resolution image by processing a low-resolution image which is generated by the compression sensing operation.

\* \* \* \* \*